(12) United States Patent
Feng et al.

(10) Patent No.: US 11,791,514 B2
(45) Date of Patent: Oct. 17, 2023

(54) BATTERY BOX AND BATTERY PACK

(71) Applicants: Shenzhen Hairun New Energy Technology Co., Ltd., Guangdong (CN); Xiamen Hithium Energy Storage Technology Co., Ltd., Fujian (CN)

(72) Inventors: Junmin Feng, Fujian (CN); Wancai Zhang, Fujian (CN); Tingting Wu, Fujian (CN)

(73) Assignees: Shenzhen Hairun New Energy Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 17/965,272

(22) Filed: Oct. 13, 2022

(65) Prior Publication Data

US 2023/0037055 A1     Feb. 2, 2023

Related U.S. Application Data

(63) Continuation of application No. PCT/CN2021/080306, filed on Mar. 11, 2021.

(30) Foreign Application Priority Data

Jul. 29, 2020   (CN) .......................... 202021537100.5

(51) Int. Cl.
  *H01M 50/242*    (2021.01)
  *H01M 10/613*    (2014.01)
  (Continued)

(52) U.S. Cl.
  CPC ....... *H01M 50/242* (2021.01); *H01M 10/613* (2015.04); *H01M 10/6554* (2015.04); *H01M 50/256* (2021.01)

(58) Field of Classification Search
  CPC ........... H01M 10/613; H01M 10/6554; H01M 50/242; H01M 50/256; H01M 50/20; H01M 50/236; Y02E 60/10
  See application file for complete search history.

(56) References Cited

U.S. PATENT DOCUMENTS

2014/0193686 A1*   7/2014   Siering ............ H01M 10/0481
                                              429/99

FOREIGN PATENT DOCUMENTS

CN      102780052 A      11/2012
CN      105655510 A       6/2016
                  (Continued)

OTHER PUBLICATIONS

English Translation CN 208507762.*
(Continued)

*Primary Examiner* — Kiran Quraishi Akhtar
(74) *Attorney, Agent, or Firm* — IP Spring

(57) ABSTRACT

A battery box and a battery pack are provided. The battery box includes a box body, a cooling plate, and a stiffener. The cooling plate is connected with an outside of a wall plate of the box body, and the stiffener is connected with the box body and abuts against a side of the cooling plate away from the wall plate. The cooling plate is connected with the box body, the stiffener is connected with the box body, and the stiffener abuts against the side of the cooling plate away from the wall plate.

22 Claims, 3 Drawing Sheets

(51) Int. Cl.
*H01M 10/6554* (2014.01)
*H01M 50/256* (2021.01)

(56) References Cited

FOREIGN PATENT DOCUMENTS

| CN | 206742456 U | 12/2017 | | |
|---|---|---|---|---|
| CN | 208507762 | * | 2/2019 | ............ Y02E 60/10 |
| CN | 208507762 U | 2/2019 | | |
| CN | 209104315 U | 7/2019 | | |
| CN | 110492042 A | 11/2019 | | |
| CN | 111065238 A | 4/2020 | | |
| CN | 212648376 U | 3/2021 | | |
| JP | 2010192207 A | 9/2010 | | |

OTHER PUBLICATIONS

CNIPA, International Search Report for International Patent Application No. PCT/CN2021/080306, dated Apr. 26, 2021, 8 pages.
CNIPA, Written Opinion for International Patent Application No. PCT/CN2021/080306, dated Apr. 26, 2021, 8 pages.

* cited by examiner

BATTERY BOX AND BATTERY PACK

CROSS-REFERENCE TO RELATED APPLICATIONS

This application is a continuation under 35 U.S.C. § 120 of International Application No. PCT/CN2021/080306, filed Mar. 11, 2021, which claims priority under 35 U.S.C. § 119(a) and/or PCT Article 8 to Chinese Patent Application No. 202021537100.5, filed Jul. 29, 2020. The entire disclosures of International Patent Application No. PCT/CN2021/080306 and Chinese Patent Application No. 202021537100.5 are incorporated herein by reference.

TECHNICAL FIELD

This disclosure relates to the field of batteries, and in particular to a battery box and a battery pack.

BACKGROUND

A battery box is mainly configured to support and accommodate a battery module. Since the battery module will generate heat during use, a cooling system needs to be adopted to cool the battery module. In the related art, the cooling system includes a cooling plate attached to an outside of the battery box, and the cooling plate is connected with the battery box. When a battery pack is in a vehicle and in operation, a connection between a liquid cooling plate and the battery box is stressed directly, which easily leads to a failure of the connection, and then leads to a failure of a cooling effect of the liquid cooling plate.

SUMMARY

A battery box is provided in implementations of the present disclosure. The battery box may include a box body, a cooling plate, and a stiffener. The cooling plate is connected with an outside of a wall plate of the box body, and the stiffener is connected with the box body and abuts against a side of the cooling plate away from the wall plate. The box body is provided with a lifting lug, the wall plate is provided with a connecting portion, the connecting portion is connected with an end of the lifting lug to form a lifting ring, and the stiffener is connected with the connecting portion.

A battery pack is further provided in implementations of the present disclosure. The battery pack includes a battery module and a battery box. The battery box may include a box body, a cooling plate, and a stiffener. The cooling plate is connected with an outside of a wall plate of the box body, and the stiffener is connected with the box body and abuts against a side of the cooling plate away from the wall plate. The box body is provided with a lifting lug, the wall plate is provided with a connecting portion, the connecting portion is connected with an end of the lifting lug to form a lifting ring, and the stiffener is connected with the connecting portion. The battery module is mounted in the battery box.

BRIEF DESCRIPTION OF THE DRAWINGS

In order to explain technical solutions in implementations of the present disclosure more clearly, the following will give a brief introduction to accompanying drawings which are needed to be used in description of implementations or the related art. It should be understood that followings drawings only illustrate some implementations of the present disclosure and thus should not be considered as limitation to the scope. For those of ordinary skill in the art, other accompanying drawings can be obtained according to these accompanying drawings without creative efforts.

REFERENCE SIGNS

Figure 1:
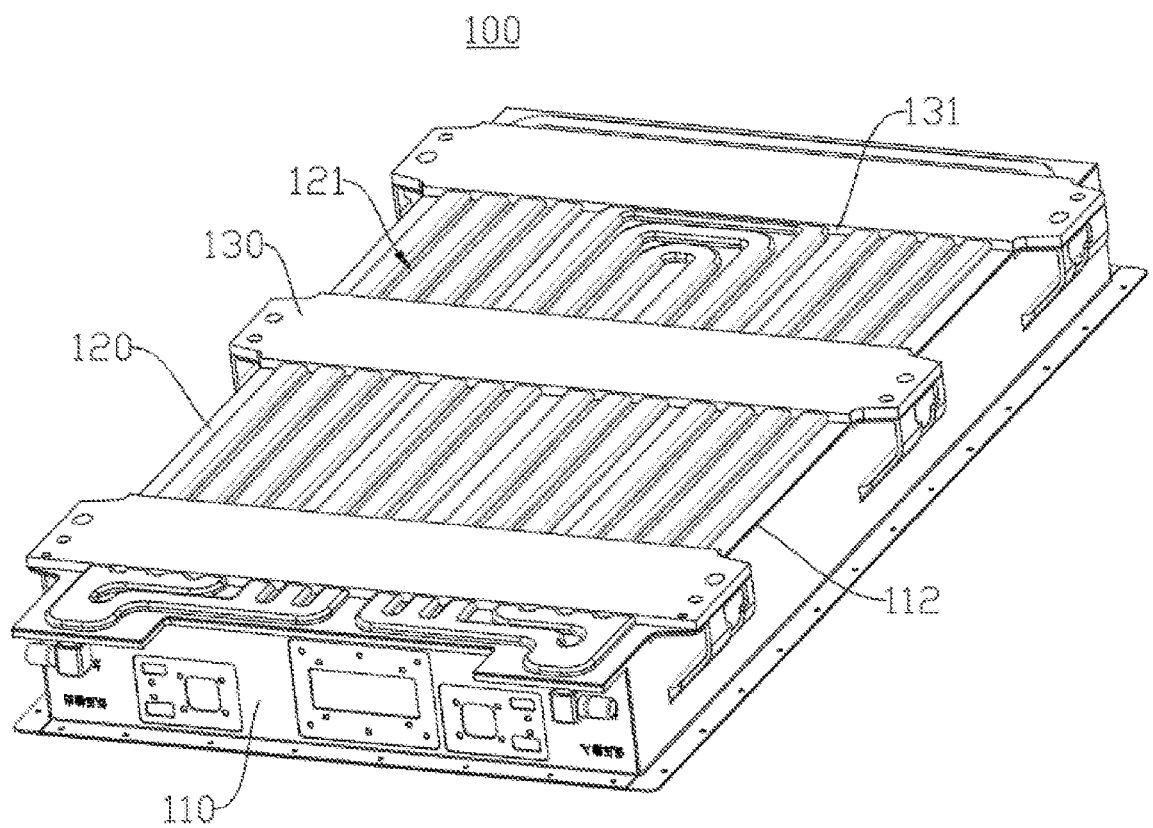
FIG. 1 is a schematic structural diagram of a battery box from a first view provided in implementations of the present disclosure.

100—battery box; 110—box body; 112—wall plate; 113—lifting lug; 114—connecting portion; 120—cooling plate; 121—groove; 130—stiffener; 131—convex portion; 140—heat insulation layer; 200—battery module; 300—battery pack.

DETAILED DESCRIPTION

In order to make a purpose, a technical solution, and an advantage of implementations of the present disclosure clearer, the technical solution of implementations of the present disclosure will be described clearly and completely in conjunction with accompanying drawings in implementations of the present disclosure. Obviously, described implementations are part of implementations of the present disclosure, not all of implementations. Generally, the assemblies of implementations of the present disclosure, which are described and illustrated in the accompanying drawings herein, may be arranged and designed in a variety of different configurations.

Therefore, the detailed description of implementations of the present disclosure provided in the accompanying drawings is not intended to limit the claimed scope of the present disclosure, but illustrates only the selected implementations of the present disclosure. All other implementations, obtained by those of ordinary skill in the art in light of implementations of the present disclosure without inventive efforts, will all fall within the claimed scope of the present disclosure.

It should be noted that similar signs and letters indicate similar items in the following accompanying drawings, and therefore, once an item is defined in an accompanying drawing, it is not necessary to further define or explain it in the subsequent accompanying drawings.

In the description of implementations of the present disclosure, it should be understood that orientation or positional relations indicated by terms such as "center", "up", "down", "left", "right", "vertical", "horizontal", "inside", and "outside" are orientation or positional relations based on the accompanying drawings, or orientation or positional relations in which the application product is placed conventionally in use, or orientation or positional relations commonly understood by those of ordinary skill in the art, only for facilitating description of the present disclosure and simplifying the description, rather than indicating or implying that the referred devices or elements must be in a particular orientation or constructed or operated in the particular orientation, and therefore they should not be construed as limiting the present disclosure.

In addition, terms such as "first", "second", etc., are used only for distinguishing the description, and should not be construed as indicating or implying relativity importance.

In the description of the present disclosure, it should be indicated that unless otherwise expressly specified or defined, terms such as "provide", "mount", "couple", and "connect" should be understood broadly, and for example, a fixed connection, or a detachable connection, or an integrated connection; and may be a direct connection, or an indirect connection via an intermediate medium, or may be an internal communication between two elements. The specific meanings of the above-mentioned terms in the present disclosure could be understood by those of ordinary skill in the art according to specific situations.

Figure 2:
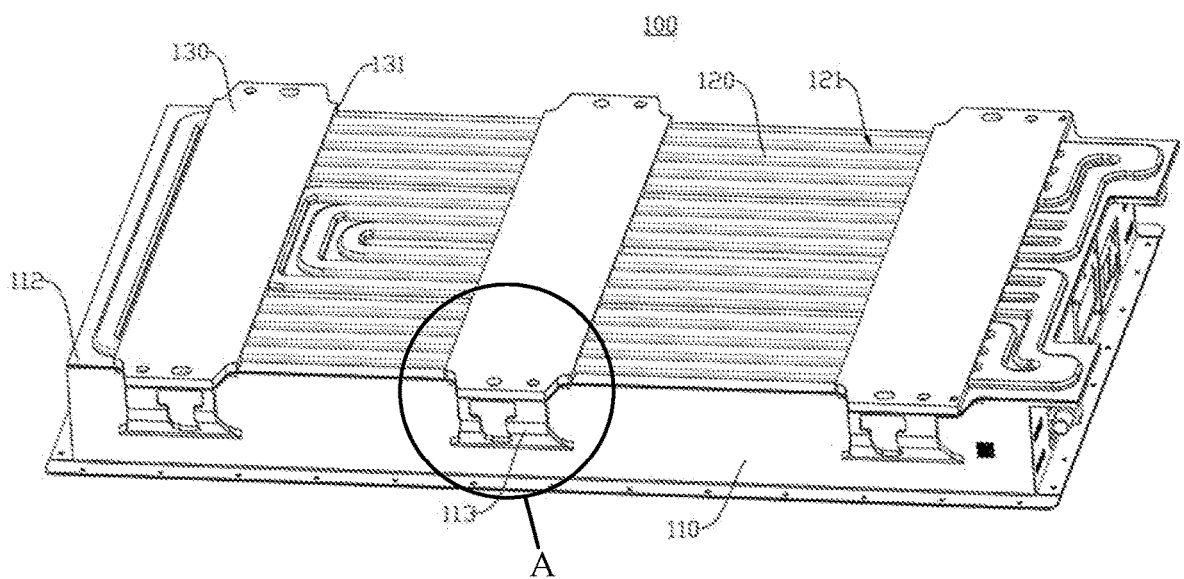
FIG. 2 is a schematic structural diagram of a battery box from a second view provided in implementations of the present disclosure.

Reference can be made to FIG. 1 and FIG. 2, where FIG. 1 is a schematic structural diagram of a battery box 100 from a first view provided in implementations of the present disclosure from a first view, and FIG. 2 is a schematic structural diagram of a battery box 100 from a second view provided in implementations of the present disclosure. A battery box 100 is provided in implementations and configured to accommodate a battery module 200.

The battery box 100 may include a box body 110, a cooling plate 120, and a stiffener 130. The box body 110 may define an accommodating space, the accommodating space can be used to accommodate the battery module 200, the box body 110 may have a wall plate 112, an inside of the wall plate 112 can constitute an inner wall of the accommodating space.

The cooling plate 120 may be connected with the box body 110, and the cooling plate 120 may be connected with an outside of the wall plate 112, that is, the cooling plate 120 may be connected with a side of the wall plate 112 away from the accommodating space.

The stiffener 130 may abut against a side of the cooling plate 120 away from the wall plate 112, and the stiffener 130 may be connected with the box body 110.

It should be noted that in implementations, the wall plate 112 connected with the cooling plate 120 may be a bottom plate of the box body 110, and the wall plate 112 may constitute a bottom wall of the accommodation space. It can be understood that in other implementations of the present disclosure, the wall plate 112 may be a side plate of the box body 110, and the side plate may be connected with the cooling plate 120. Alternatively, in other implementations of the present disclosure, the cooling plate 120 may also be disposed on both the bottom plate and the side plate of the box body 110 as needed.

In implementations, for example, the wall plate 112 is the bottom plate of the box body 110. It can be understood that an identical effect may also be realized if the wall plate 112 is the side plate of the box body 110.

In implementations, the wall plate 112 of the box body 110 and the cooling plate 120 may be welded by friction stir welding.

Figure 3:
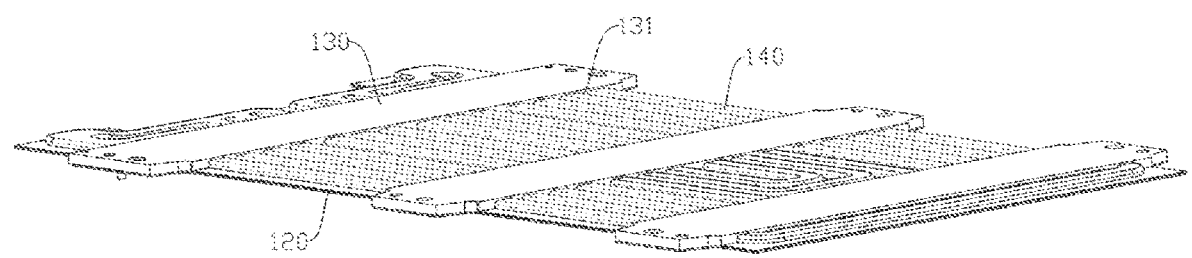
FIG. 3 is a schematic structural diagram of a cooling plate and stiffeners provided in implementations of the present disclosure.

Reference can be made to FIG. 3, which is a schematic structural diagram of a cooling plate 120 and stiffeners 130 provided in implementations of the present disclosure. In implementations, the cooling plate 120 may be molded by stamping, and the cooling plate 120 may be provided with multiple cooling channels (not illustrated in FIG. 3) for a liquid coolant to flow. Therefore, multiple long-strip grooves 121 can be defined between outside walls of adjacent cooling channels. In other words, the cooling plate 120 may define multiple grooves 121 at a surface of the cooling plate 120. The stiffener 130 may abut against the surface of the cooling plate 120.

In implementations, the stiffener 130 may be provided with multiple convex portions 131, and one convex portion 131 is corresponding to one groove 121. One convex portion 131 may extend into one groove 121, such that each convex portion 131 can abut against at least part of an inner side surface of each groove 121. In other words, the each convex portion 131 may extend into each groove 121, such that the each convex portion 131 abuts against a bottom surface, an inner side surface, or all inner surfaces of the each groove 121. It can be understood that the each convex portion 131 abuts against part of or all of inner surfaces of the each groove 121, which can avoid relative movement between the each convex portion 131 and the each groove 121, so as to make the stiffener 130 and the cooling plate 120 present a better abutting state, thereby preventing the stiffener 130 and the cooling plate 120 from moving relative to each other.

It should be noted that in other implementations of the present disclosure, the number of convex portions 131 may be less than the number of grooves 121. For example, the convex portions 131 of the stiffener 130 only extend into a part of grooves 121, which can also stabilize the stiffener 130 and the cooling plate 120.

In implementations, the each groove 121 has almost the same shape and size, so the each convex portion 131 has almost the same shape and size. It can be understood that in other implementations of the present disclosure, the multiple grooves 121 may be designed to be not exactly the same as needed, and corresponding convex portions 131 may be adaptively matched and adjusted.

In addition, in other implementations of the present disclosure, the cooling plate 120 may not be in the shape illustrated in implementations of the present disclosure, and the grooves 121 on the surface of the cooling plate 120 may be defined in a process of preparing cooling channels in an early stage or defined in a later stage.

A surface of the cooling plate 120 away from the wall plate 112 may be a flat surface and does not define the grooves 121. Accordingly, the stiffener 130 may directly abut against the flat surface of the cooling plate 120 without the convex portions 131, or the stiffener 130 may be provided with the convex portions 121 and abut against the flat surface.

It can be understood that in other implementations, the cooling plate 120 may be provided with convex portions 131, accordingly, the stiffener 130 may define grooves 121, and the convex portions 131 extend into the grooves 121 respectively, such that relative stability of the cooling plate 120 and the stiffener 130 is realized.

Optionally, in order to increase an abutting effect of the stiffener 130 on the cooling plate 120, a surface of the stiffener 130 facing the cooling plate 120 may be in surface contact with the cooling plate 120. The surface of the stiffener 130 facing the cooling plate 120 may be a curved surface or a flat surface, and the surface contact can reduce a gap between the stiffener 130 and the cooling plate 120 and avoid deformation of the cooling plate 120 as much as possible.

In implementations, the stiffener 130 may be a long-strip plate, and the cooling plate 120 may also be a substantially rectangular plate. The stiffener 130 may extend from one side of the cooling plate 120 to another side of the cooling plate 120. Two opposite ends of the stiffener 130 in a length direction of the stiffener 130 may be located on two sides of the cooling plate 120 respectively, such that the cooling plate 120 is abutted against by the stiffener 130 in the length direction of the stiffener 130.

In implementations, a surface of the stiffener 130 away from the wall plate 112 may be parallel to the wall plate 112. In other implementations of the present disclosure, the stiffener 130 may be disposed in a curved shape, and the stiffener 130 may be bent on the surface of the cooling plate 120, or in other implementations, the stiffener 130 may also be in a plate shape which is similar to the shape of the cooling plate 120.

Reference can made to FIG. 3 again, and in some implementations, the battery box 100 may include three stiffeners 130, and the three stiffeners 130 may be arranged at intervals. In implementations, the three stiffeners 130 may be arranged in parallel. It can be understood that in other implementations of the present disclosure, the three stiffeners 130 may be arranged at intervals and at an angle with each other. Alternatively, the three stiffeners 130 may be arranged in an interconnected manner, for example, the three stiffeners 130 are connected in an "H" shape, etc.

In addition, in other implementations of the present disclosure, the number of the stiffener 130 may not be limited to three, for example, may be one, two, four or more, and so on. A shape of the stiffener 130 is not limited. For example, the stiffener 130 may be implemented as one stiffener 130, the stiffener 130 may be in a scattering form, the stiffener 130 may have portions extending in multiple directions, and each portion can abut against the cooling plate 120.

Optionally, in some implementations, two of the three stiffeners 130 may be connected with the two opposite ends of the cooling plate 120 respectively. In other words, one stiffener 130 may be connected with one end of the cooling plate 120, and another stiffener 130 may be connected with another end of the cooling plate 120. One remaining stiffener 130 may be connected with a middle of the cooling plate 120, where the middle is not limited to a middle position of the cooling plate 120 in size, but means a position which is not at ends of the cooling plate 120.

Optionally, in some implementations, the stiffener 130 may be implemented as three or more stiffeners 130, two stiffeners 130 abut against two ends of the cooling plate 120 respectively, and rest of stiffeners 130 are connected with a middle of the cooling plate 120.

In this arrangement manner, edge lifting of an end of the cooling plate 120 can be avoided under an action of the stiffener 130. The stiffener 130 can keep the end of the cooling plate 120 and the box body 110 in an abutting state. Even if the battery box 100 is subjected to a force applied by environment or the battery module 200, a sealing failure caused by the force applied to a weal seam between the cooling plate 120 and the box body 110 will not occur, thereby avoiding a failure of a cooling effect.

It can be understood that in other implementations of the present disclosure, the stiffener 130 may not be connected with the end of the cooling plate 120.

In implementations, the battery box 100 may further have a heat insulation layer 140, the insulation layer 140 may be connected with the side of the cooling plate 120 away from the wall plate 112 by spraying, and the stiffener 130 may abut against the heat insulation layer 140.

The heat insulation layer 140 can insulate the cooling plate 120 to prevent a cooling capacity of the cooling plate 120 from losing to the side of the cooling plate 120 away from the wall plate 112.

In some implementations, the heat insulation layer 140 may be formed by curing of a heat insulation adhesive attached to the surface of the cooling plate 120, and a shape of a surface of the heat insulation layer 140 away from the surface of the cooling plate 120 may be similar to a shape of the cooling plate 120 away from the wall plate 112. Therefore, in implementations, the shape of the cooling plate 120 is taken as an example to describe. It can be understood that the shape of the surface of the heat insulation layer 140 away from the wall plate 112 may also be changed according to filling requirements.

Figure 4:
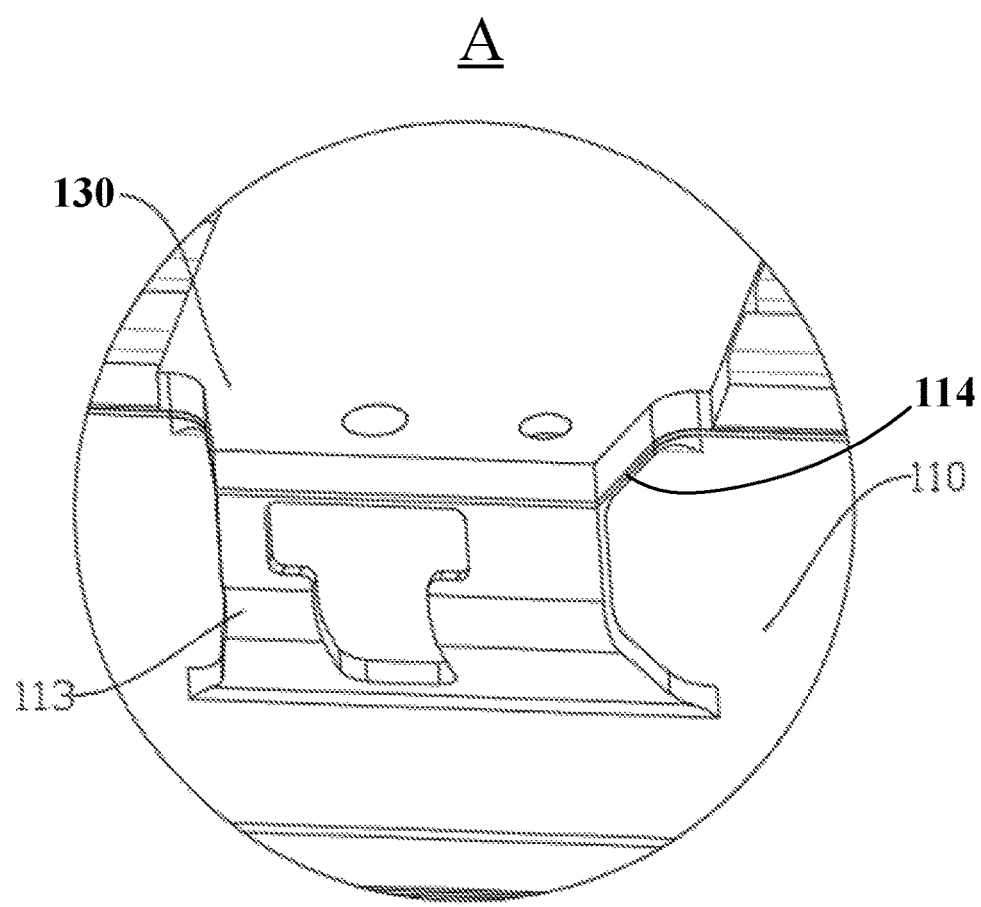
FIG. 4 is a partial enlarged schematic diagram of a battery box at circle A in FIG. 2.

Reference can be made to FIG. 4, which is a partial enlarged schematic diagram of a battery box 100 at circle A in FIG. 2. In implementations, the stiffener 130 may be connected with the battery box 100 through bolts.

The box body 110 may be provided with a lifting lug 113, the wall plate 112 may be provided with a connecting portion 114, the connecting portion 114 may be connected with an end of the lifting lug 113 to form a lifting ring, and the stiffener 130 may be connected with the connecting portion 114.

In some implementations, the wall plate 112 may be provided with the connecting portion 114 which protrudes from the wall plate 112, and the connecting portion 114 and the lifting lug 113 may be enclosed to form the lifting ring. The connecting portion 114 may be integrated with the lifting lug 113, which is beneficial to reducing a space occupied by the lifting lug 113, so as to reduce a volume of the box body 110. In addition, the stiffener 130 may be connected with the connecting portion 114, and the connecting portion 114 can be connected with the stiffener 130 without bending the stiffener 130.

It should be noted that in other implementations of the present disclosure, the stiffener 130 may also be connected with the box body 110 in other connection manners. For example, the stiffener 130 and the box body 110 may be welded together, or be connected by screw threads or clamping.

The battery box 100 provided in implementations of the present disclosure at least has following advantages. The cooling plate 120 is connected with the wall plate 112 of the box body 110, the stiffener 130 abuts against the side of the cooling plate 120 away from the wall plate 112, and the stiffener 130 is connected with the box body 110. The stiffener 130 can keep the cooling plate 120 and the box body 110 in the abutting state. The stiffener 130 is connected with the box body 110 and abuts against the cooling plate 120 to increase strength and stiffness of a connection between the cooling plate 120 and the box body 110, so as to avoid the sealing failure caused by the force applied to the weld seam between the cooling plate 120 and the box body 110 during the operation of the battery pack, which leads to the failure of the cooling effect of the cooling plate 120.

Optionally, in terms of implementations of connecting the stiffener 130 and the cooling plate 120 by fitting connections among the convex portions 131 and the grooves 121, the fitting connections among the convex portions 131 and the grooves 121 can make the stiffener 130 and the cooling plate 120 better abut against each other, so as to increase a fitting degree of the stiffener 130 and the cooling plate 120.

Figure 5:
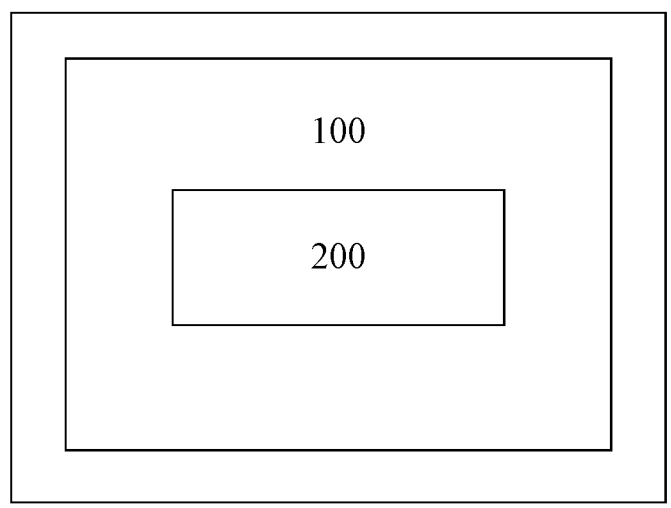
FIG. 5 is a schematic diagram of a battery pack provided in implementations of the present disclosure.

Reference can be made to FIG. 5, which is a schematic diagram of a battery pack provided in implementations of the present disclosure. A battery pack 300 is further provided in implementations of the present disclosure. The battery pack 300 may include a battery module and the above battery box 100, and the battery module 200 is mounted in the battery box 100.

The battery pack has at least all the advantages of the above battery box 100, and the cooling plate 120 of the battery pack can have a relatively great cooling effect on the battery pack.

The above descriptions are only preferred implementations of the present disclosure, and are not used to limit the present disclosure. For those of ordinary skill in the art, the present disclosure may have various changes and variations. Any modification, equivalent replacement, improvement, etc. made within the spirit and principles of the present disclosure shall be included in the scope of protection of the present disclosure.

The battery box and the battery pack are provided in the present disclosure. The battery box includes a box body, a cooling plate, and a stiffener. The cooling plate is connected with the outside of the wall plate of the box body, and the stiffener is connected with the box body and abuts against the side of the cooling plate away from the wall plate. The cooling plate is connected with the box body, the stiffener is connected with the box body, and the stiffener abuts against the side of the cooling plate away from the wall plate. The stiffener can keep the cooling plate and the box body in the abutting state, and when the cooling plate is subjected to the external pressure or the action of the battery module, the cooling plate may be bent or deformed, resulting in the gap between the cooling plate and the wall plate. The stiffener is connected with the box body and abuts against the cooling plate to increase the strength and the stiffness of the connection between the cooling plate and the box body, so as to avoid the sealing failure caused by the force applied to the weld seam between the cooling plate and the box body during the operation of the battery pack, which leads to the failure of the cooling effect of the cooling plate.

In addition, it can be understood that the battery box and the battery pack of the present disclosure can be reproduced and can be used in a variety of industrial applications. For example, the battery box and battery pack of the present disclosure can be used for any component that requires a battery to supply power.

What is claimed is:

1. A battery box, comprising:
   a box body;
   a cooling plate connected with an outside of a wall plate of the box body; and
   a stiffener connected with the box body and abutting against a side of the cooling plate away from the wall plate, wherein
   the box body is provided with a lifting lug, the wall plate is provided with a connecting portion, the connecting portion is connected with an end of the lifting lug to form a lifting ring, and the stiffener is connected with the connecting portion,
   wherein the connecting portion is integrated with the lifting lug, and
   wherein the lifting lug protrudes from a side wall of the box body, one part of the lifting lug is bent towards the stiffener, the other part of the lifting lug is bent towards the box body and connected to the connecting portion.

2. The battery box of claim 1, wherein the cooling plate defines grooves at the side of the cooling plate away from the box body, and the stiffener is provided with convex portions in fit with the grooves, and the convex portions extend into the grooves respectively and abut against at least part of inner side surfaces of the grooves.

3. The battery box of claim 1, wherein the cooling plate has convex portions at the side of the cooling plate away from the box body, and the stiffener defines grooves in fit with the convex portions, and the convex portions extend into the grooves respectively and abut against at least part of inner side surfaces of the grooves.

4. The battery box of claim 2, wherein a number of the convex portions is less than or equal to a number of the grooves.

5. The battery box of claim 1, wherein a surface of the cooling plate away from the box body is a flat surface.

6. The battery box of claim 5, wherein the stiffener is not provided with convex portions and directly abuts against the flat surface of the cooling plate; or the stiffener is provided with the convex portions and abuts against the flat surface of the cooling plate through the convex portions.

7. The battery box of claim 1, wherein the stiffener is in surface contact with a surface of the cooling plate away from the wall plate.

8. The battery box of claim 1, wherein a surface of the stiffener facing the cooling plate is a curved surface or a flat surface.

9. The battery box of claim 1, further comprising:
   a heat insulation layer being connected with the side of the cooling plate away from the wall plate and abutting against the stiffener.

10. The battery box of claim 1, wherein the stiffener is implemented as a plurality of stiffeners arranged at intervals.

11. The battery box of claim 1, wherein the stiffener is implemented as three or more stiffeners, two stiffeners abut against two ends of the cooling plate respectively, and rest of stiffeners are connected with a middle of the cooling plate.

12. The battery box of claim 1, wherein the stiffener has two opposite ends located at two sides of the cooling plate respectively and each connected with the wall plate.

13. The battery box of claim 1, wherein the stiffener is plate-like, and a surface of the stiffener away from the wall plate is parallel to the wall plate.

14. A battery pack, comprising:
    a battery module; and
    the battery box of claim 1, wherein the battery module is mounted in the battery box.

15. The battery pack of claim 14, wherein the cooling plate defines grooves at the side of the cooling plate away from the box body, and the stiffener is provided with convex portions in fit with the grooves, and the convex portions extend into the grooves respectively and abut against at least part of inner side surfaces of the grooves.

16. The battery pack of claim 14, wherein the cooling plate has convex portions at the side of the cooling plate away from the box body, and the stiffener defines grooves in fit with the convex portions, and the convex portions extend into the grooves respectively and abut against at least part of inner side surfaces of the grooves.

17. The battery pack of claim 15, wherein a number of the convex portions is less than or equal to a number of the grooves.

18. The battery pack of claim 14, wherein a surface of the cooling plate away from the box body is a flat surface.

19. The battery pack of claim 14, wherein the connecting portion is integrated with the lifting lug.

20. The battery box of claim 1, wherein the lifting lug defines a hole, and the lifting lug is configured to be lifted through the hole to lift the battery box.

21. The battery pack of claim 19, wherein the lifting lug protrudes from a side wall of the box body, one part of the lifting lug is bent towards the stiffener, the other part of the lifting lug is bent towards the box body and connected to the connecting portion.

22. The battery pack of claim 21, wherein the lifting lug defines a hole, and the lifting lug is configured to be lifted through the hole to lift the battery box.

\* \* \* \* \*